M. L. CALLENDER.

Lamp Burner.

No. 2,493.

Reissued Feb. 26, 1867.

Witnesses

Thos Lewis Harvey.

Chas. H. Smith.

Inventor

Mills L. Callender.

N. PETERS, Photo-Lithographer, Washington, D. C.

United States Patent Office.

ALEXANDER J. WALKER, OF NEW YORK, N. Y., ASSIGNEE BY MESNE ASSIGNMENTS OF MILLS L. CALLENDER.

*Letters Patent No.* 48,128, *dated June* 6, 1865; *reissue No.* 2,493, *dated February* 26, 1867.

IMPROVEMENT IN LAMPS.

The Schedule referred to in these Letters Patent and making part of the same.

TO ALL WHOM IT MAY CONCERN:

Be it known that MILLS L. CALLENDER, of the city and State of New York, did invent, make, and apply to use a certain new and useful Improvement in Lamps; and the following is declared to be a full, clear, and exact description of the same, reference being had to the annexed drawing, making part of this specification, wherein—

Similar marks of reference denote the same parts in all the figures.

Figure 1:
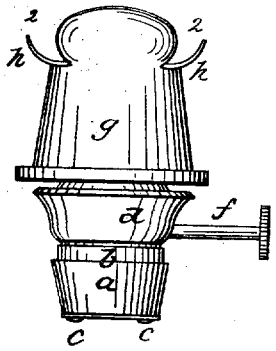
Figure 1 is an elevation of the burner for lamps.
Figure 2:
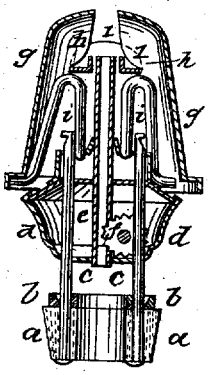
Figure 2 is a vertical section of the same.
Figure 3:
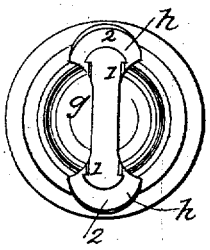
Figure 3 is a plan of the cone or deflector.
Figure 4:
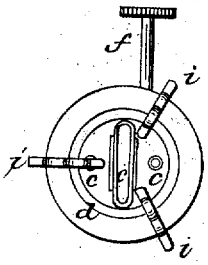
Figure 4 is a plan with the cone or deflector removed.

Lamps have heretofore been made with a thimble uniting the burner to the lamp in such a manner that the burner could be raised for filling the lamp without being unscrewed, and a support for the cone or deflector has been provided, that is lengthened in a horizontal direction to prevent heat being conducted to the wick-tube, as shown in the patent of M. L. Callender, dated February 18, 1862, and lips have been made on each side of the wick-tube upon which the base of the flame rests.

The nature of the said invention consists in a stopper of India rubber attached to the burner in such a manner that the ordinary screw is dispensed with, and access allowed for filling by lifting the burner, rods being provided to connect the burner and stopper on or with which rods the burner slides. The metallic connection from the burner to the cone or deflector is a bent or folded wire or strip, to allow of its length being greater than a direct connection would be and thereby prevent the conduction of heat, the size or shape of the burner not being necessarily changed. A metallic plate is employed across the deflector with an opening for the wick-tube and flame, the ends of said plate extending beyond the ends of the slot in the deflector to form a flame spreader. This burner may be used with or without a chimney.

In the drawing, *a* is a ring or cylinder of rubber, forming a stopper with a metallic top-piece, *b*; and *c c* are wires connecting *a* and *b*, and passing up into and through the body or shell *d* of the burner, and a hole is made through the centre of *a* and *b*. This stopper *a* is to be entered into the top of the lamp reservoir, and its elasticity makes it fit tightly in place. The reservoir can be filled through the centre hole of *a* and *b* when the burner is raised, after which it is again lowered to place. If the two wires *c c* are used this attachment will be very firm, but one wire might be employed so that the lamp burner could be turned aside after it had been raised, and the wire *c* might be attached to the burner and slide into the reservoir instead of rising above it, and at all times maintain a firm connection between the reservoir and burner. *e* is the wick-tube; and *f*, the wick-raiser, of any usual character. *g* is the cone or deflector, having a slot at its upper end for passing the flame. This cone is sustained by the supports *i i i*, which are folded so as to pass up and then down to increase the distance that heat imparted to the cone by the flame must be conducted before reaching the burner or wick-tube. These connections *i i* may be of any desired number, and formed of wire or strips of metal, and the ends are to be attached to the burner, and cone or deflector, respectively, in any convenient manner. *h* is a metal plate, passing across the deflector at the bottom of the opening in the same, at about the level of the top of the wick-tube, in which plate is a hole rather larger than the wick-tube, leaving a space for air to pass into the base of the flame, and the metal at the edges of this hole may be bent up to form lips 1 1. A current of air passes between the edges of this hole and the wick-tube *e*, into the flame, promoting combustion and lessening the heat of the wick-tube; the air also passes above the plate *h*, against the sides of the flame as it goes through the opening in *g*. The ends of this plate *h* are extended at 2 2, outside the deflector *g*; the object being to cause the flame to spread wider and flatter by said projections 2 2 arresting the current of air that ascends around the outside of the burner, and would, if not deflected, have a tendency to prevent the flame spreading. These projections 2 2 cause a much more perfect light, because the air passing through the cone is at liberty freely to spread said flame into a thin sheet.

What is claimed, and to be secured by Letters Patent, is—

1. Sustaining the cone or deflector by supports that are bent or folded to allow of their being of increased length for the purposes and substantially as specified.

2. The plate *h*, extending across the cone or deflector *g*, and formed with the flame-spreading projections 2 2, for the purposes and substantially as set forth.

3. The lips 1 1, and projections 2 2, on the plate *h*, in combination with the deflector *g*, and wick-tube, substantially as and for the purposes set forth.

4. The India-rubber ring *a*, with an opening through which to fill the lamp, in combination with the rods *c*, carrying the burner as set forth.

In witness whereof I have hereunto set my signature this 7th day of February, A. D. 1867.

ALEX. J. WALKER.

Witnesses:

CHAS. H. SMITH,

GEO. T. PINCKNEY.